Figure 13:
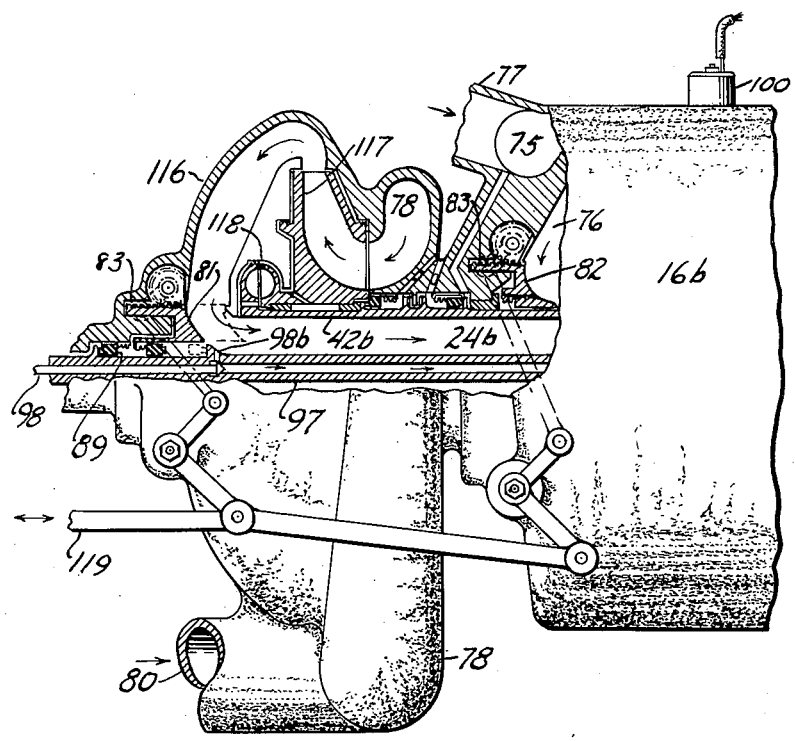

May 29, 1962 C. W. CHILLSON 3,036,428
SELF-FEEDING ROCKET MOTOR
Filed Dec. 16, 1950 5 Sheets-Sheet 1
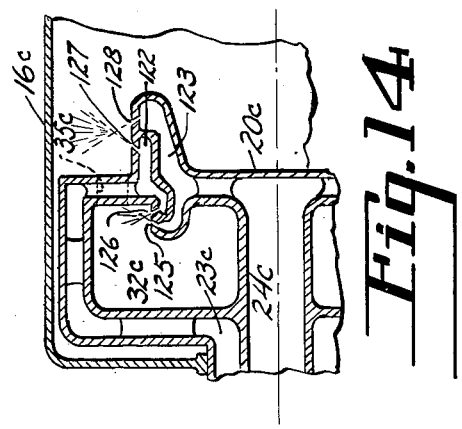
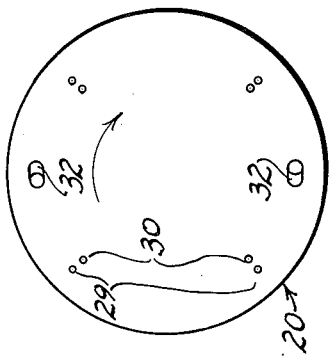
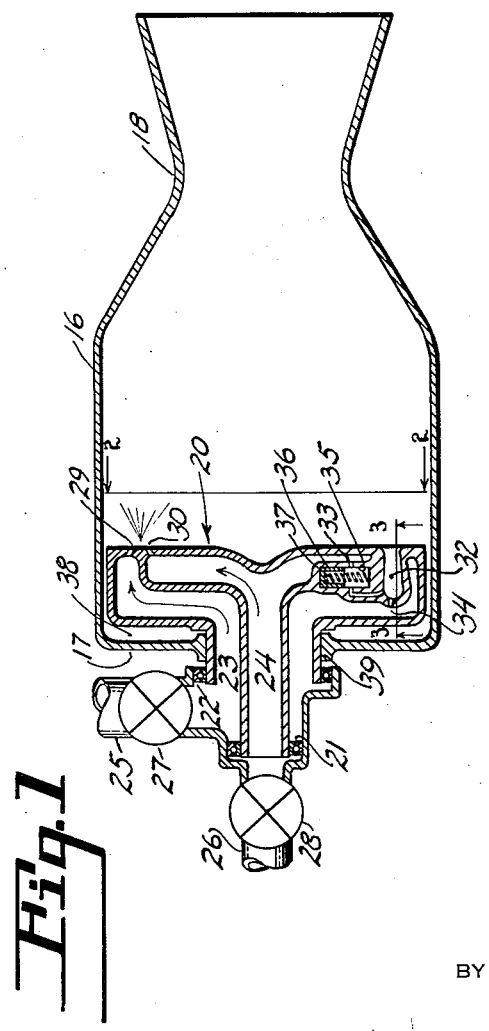
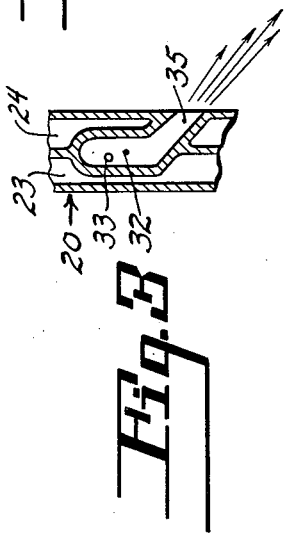
INVENTOR.
CHARLES W. CHILLSON
BY
ATTORNEYS.

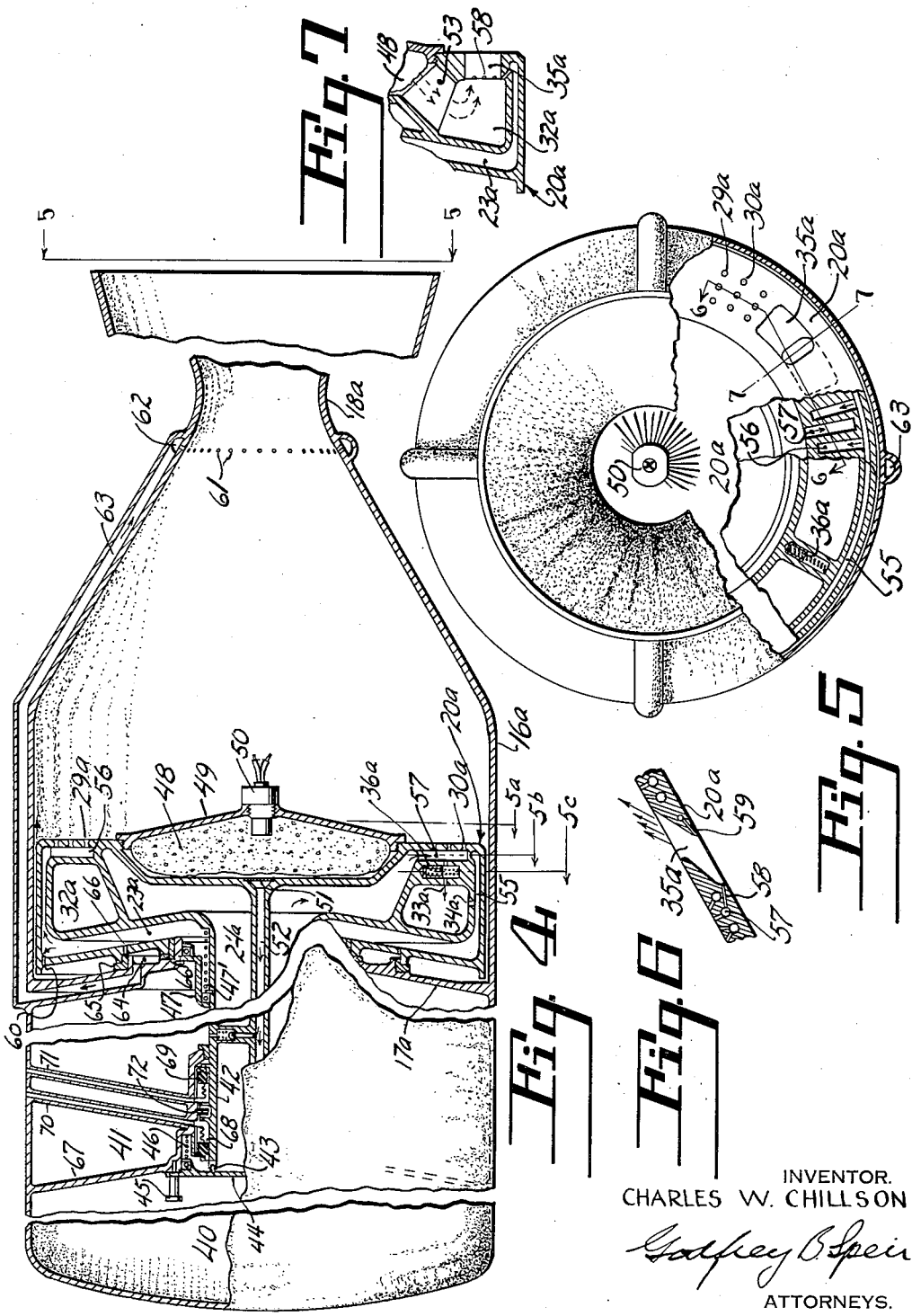

May 29, 1962   C. W. CHILLSON   3,036,428
SELF-FEEDING ROCKET MOTOR
Filed Dec. 16, 1950   5 Sheets-Sheet 3
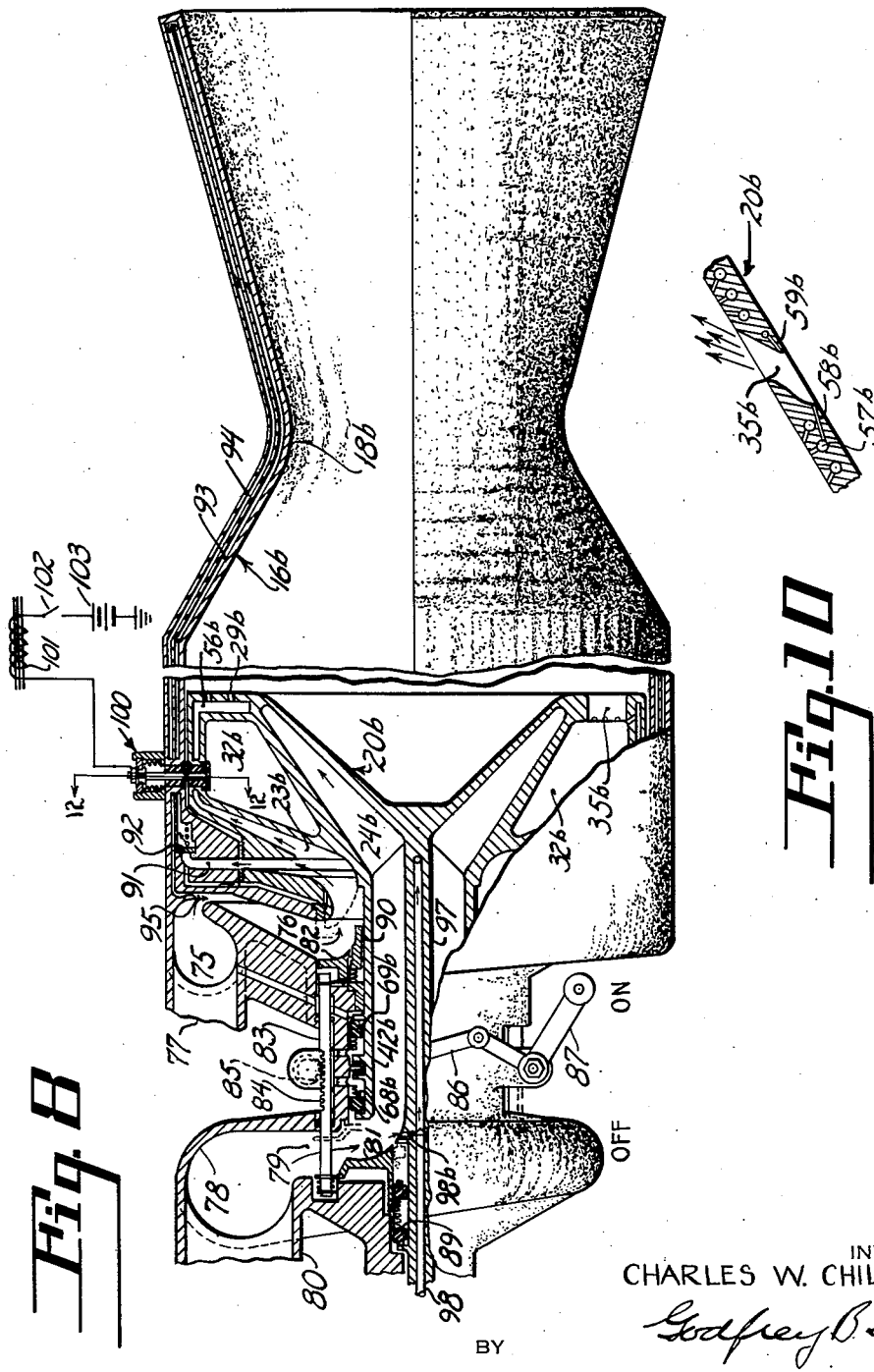
INVENTOR.
CHARLES W. CHILLSON
BY
ATTORNEYS.

May 29, 1962   C. W. CHILLSON   3,036,428
SELF-FEEDING ROCKET MOTOR
Filed Dec. 16, 1950   5 Sheets-Sheet 4
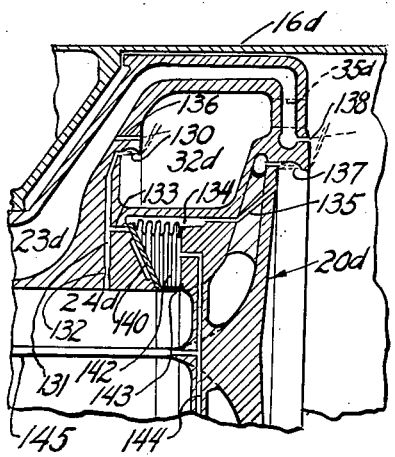
Fig.15
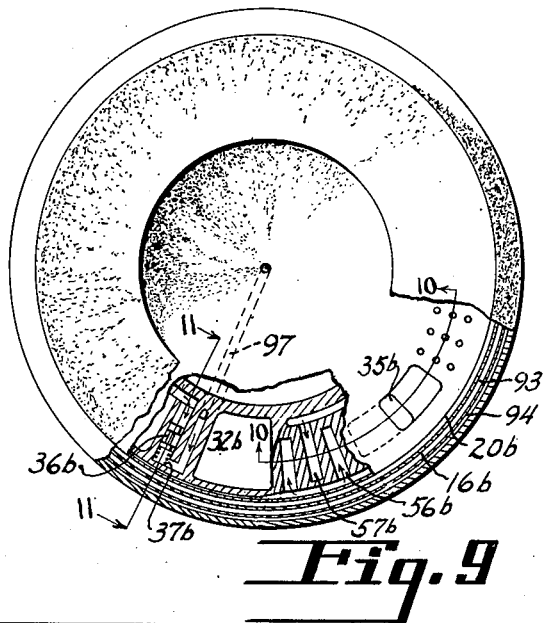
Fig.9
Fig.11
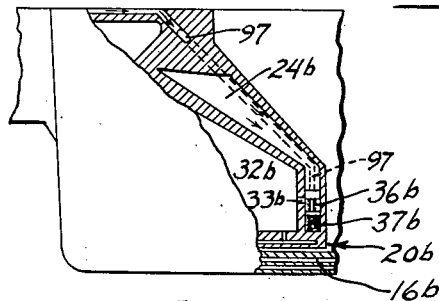
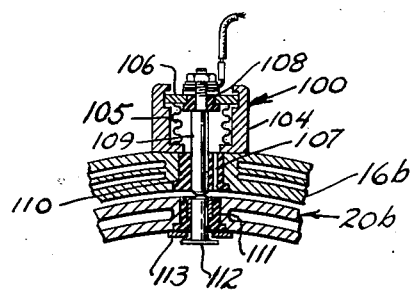
Fig.12
INVENTOR.
CHARLES W. CHILLSON
BY
Godfrey B. Spear
ATTORNEYS.

May 29, 1962  C. W. CHILLSON  3,036,428
SELF-FEEDING ROCKET MOTOR

Filed Dec. 16, 1950  5 Sheets-Sheet 5

INVENTOR.
CHARLES W. CHILLSON
BY Godfrey B. Spein
ATTORNEYS.

United States Patent Office 3,036,428
Patented May 29, 1962

3,036,428
SELF-FEEDING ROCKET MOTOR
Charles W. Chillson, Packanack, N.J., assignor to Curtiss-Wright Corporation, a corporation of Delaware
Filed Dec. 16, 1950, Ser. No. 201,123
19 Claims. (Cl. 60—35.6)

My invention relates to jet propulsion for aircraft, missiles and other vehicles capable of space travel, which utilize liquid propellants, and to combustors requiring fuel feed.

The invention further relates to the type of jet propulsion power plants wherein the fuel or fuels utilized include burnable components and oxidizing components whereby the motor or engine is independent of the ambient atmosphere for its operation.

While previous reaction engines have enjoyed a substantial degree of development, particularly by the late Dr. Robert H. Goddard, virtually all of them depend upon the use of pressurized fuel tanks or on separately driven pumping apparatus to provide fuel feed to a main combustion chamber. The prior arrangements for fuel feed require rather complicated control and ducting systems which increase the weight and space requirements for the entire rocket power plant to an extent which seems disproportionate to the final results which are accomplished.

According to the present invention, pumping of liquid fuels to a rocket combustion chamber is accomplished by a unitary pumping and distributing rotor which is disposed wholly within a main reaction combustion chamber, the rotor itself being driven by jet reaction effected by the combustion of small amounts of the fuels in auxiliary combustion chambers within this rotor. The reaction nozzles of the rotor, discharging into the main combustion chamber, are slanted to provide a rotating force. Upon rotor rotation, liquid fuels are centrifugally pumped to primary jets near the rim of the rotor which inject the fuels into the main combustion chamber for burning, pressure rise, and issue from the main reactor nozzle or orifice. With this arrangement, that portion of the fuel utilized for driving the pumping rotor becomes effective in the main combustion chamber for propulsive effort.

The invention further includes various items of auxiliary apparatus to provide for speed regulation of the pumping rotor, ignition of the fuels both for driving the rotor and for the main combustion chamber, for control and metering of the fuels whereby the thrust of the reaction engine may be varied, and for starting of the rocket engine.

The invention further contemplates various modifications of the reaction engine of the invention, adapting it as a package unit for application in military missiles which are utilized but once, or for application to non-expendable vehicles or other devices wherein repeated use of the reaction engine may be desired.

The invention further comprises suggestions for further development of reaction engines of the fundamental types herein exploited to the end that the quintessence of simplicity and reliability, along with minimum weight and space requirements for engines of adequate power, may be ultimately attained.

The principles of the invention may readily be appreciated by reading the annexed detailed description in connection with the drawings wherein similar reference characters represent similar parts and wherein:

FIG. 1 is a longitudinal section of a rocket engine incorporating the fundamental principles of the invention;
FIG. 2 is an end view on the line 2—2 of FIG. 1;
FIG. 3 is a fragmentary section on the line 3—3 of FIG. 1;
FIG. 4 is a longitudinal section of an alternative type of reaction engine incorporating starting and other features, this type of rocket engine being arranged for indefinite storage prior to use and for one-time operation;
FIG. 5 is an end view on the line 5—5 of FIG. 4, including fragmentary sections on the lines 5a, 5b and 5c of FIG. 4;
FIG. 6 is a fragmentary section on the line 6—6 of FIG. 5;
FIG. 7 is a fragmentary section on the line 7—7 of FIG. 5;
FIG. 8 is a longitudinal section through an alternative type of reaction engine adapted for multiple use such as in man-carrying craft;
FIG. 9 is an end view of the engine of FIG. 8 including fragmentary sections through portions of the coolant jackets and pump rotor;
FIG. 10 is a fragmentary section on the line 10—10 of FIG. 9;
FIG. 11 is a fragmentary section on the line 11—11 of FIG. 9;
FIG. 12 is an enlarged section on the line 12—12 of FIG. 8 showing an arrangement for fuel ignition;
FIG. 13 is a fragmentary longitudinal section of an engine somewhat like that of FIG. 8 incorporating booster pump and throttling provisions;
FIG. 14 is a longitudinal section through a portion of a rocket engine showing alternative main and auxiliary fuel jets; and
FIG. 15 is a fragmentary longitudinal section of a portion of a rocket engine showing alternative main and auxiliary fuel jets along with a rotor speed regulating arrangement.

Referring first to FIGS. 1–3, a main combustion chamber is shown at 16 which may comprise a cylindrical member effectively closed at 17 at one end and having a converging-diverging reaction nozzle 18 at its other end. Within the chamber and close to the closed end 17 is a rotor 20, carried in a bearing 39 and sealed to the stationary parts at 21 and 22, the rotor having therein fuel passages 23 and 24 fed respectively from fuel conduits 25 and 26 leading from suitable fuel supply tankage. Valves 27 and 28 are indicated in the conduits 25 and 26 for turning on and off the flow of the respective fuels.

The term "fuels" as used herein include both liquid fuels and liquid oxidizers and include coolant components as necessary. The term "propellant" is frequently used in this art, and "fuels" as mentioned herein are intended to include "propellants." There is a wide range of liquid fuels and liquid oxidizers for reaction engines of the present type. In addition, there is a class of monopropellants which are fairly stable mixtures, in a single liquid, of fuel and oxidizer. When such fuels are to be used, the various provisions of this invention remain substantially the same except that single tankage, fuel conduits, and jet arrangements would replace the dual arrangements shown which are essentially for fuel combinations embodying two separate liquids. Among available fuels are those which are self-igniting when mixed and also those which may require ignition. The provisions of this invention comprehend ignition means for those fuels which require ignition.

Returning to FIG. 1, the rotor fuel passages 23 and 24 extend radially outwardly in the rotor and are provided with main fuel jets 29 and 30 near the rotor rim which are arranged so that the fluids issuing from the jets impinge upon one another for intimate admixture of the fuel components to enable efficient combustion. When the mixture of fuels is ignited, combustion occurs within the chamber 16, building up the pressure therein whereupon the hot gases issue from the nozzle 18 to provide a reactive force. As the rotor 20 is rotated at considerable speed, it serves as a centrifugal pump, drawing fuel from the conduits 25 and 26 and delivering it to the jets 29 and 30 under pressure resulting from centrifugal force due to rotor rotation.

To drive the rotor at the required speed, one or more auxiliary combustion chambers 32 are formed near the rim of the rotor 20, some of the fuel in the passages 23 and 24 being fed to these combustion chambers through passages 33 and 34. Combustion of these fuel portions occurs in the combustion chambers 32 which are provided with helically slanted nozzles 35 delivering combustion products from the auxiliary chamber 32 into the main chamber 16. Reaction of these gases produces a tangential force component upon the rotor to drive it at appropriate speed whereby pumping is produced by the rotor.

It will be realized that the main combustion chamber 16 operates at elevated pressure, for example approximately 1000 pounds per square inch absolute, this pressure dropping to the ambient pressure downstream of the nozzle 18. In order to obtain propulsive effect on the rotor 20, the pressure in the auxiliary combustion chambers 32 must be greater than that in the main chamber 16, for example 1300 pounds per square inch absolute. To attain fuel feed to the respective combustion chambers, fuel pressures developed centrifugally by the rotor 20 must be in excess of auxiliary combustion chamber pressure and main chamber pressure. The proper amounts of fuel to be fed to the respective chambers are established by the size and form of the several fuel jets 29, 30, 33 and 34 so that the power applied to the rotor 20 is sufficient to pump an adequate amount of fuel to produce the thrust required at the main reaction nozzle 18. These relative values and sizes and forms may be calculated and established by conventional experimental procedures.

The fuel feed through the main combustion chamber from the nozzles 29 and 30 and consequently, the thrust available from the engine, is established by the rotational speed of the rotor 20. Accordingly, this speed to accomplish steady power output from the engine must be held substantially constant. To this end, the feed of one or both of the fuels to the auxiliary combustion chambers 32 may be controlled in response to the speed of the rotor 20. Should the rotor 20 tend to overspeed, resumption of normal speed may be accomplished by throttling the auxiliary chamber fuel while if the rotor tends to underspeed, additional fuel to the auxiliary chambers 32 will enforce restoration to normal speed. While many arrangements may be made for this simultaneous governing and throttling function, an extremely simple and automatic arrangement consists in forming, in the rotor 20, a substantially radial cylindrical cavity within which is arranged a piston valve 36 urged inwardly by a spring 37. Fuel feed passage 33 to the auxiliary chamber is interrupted by the cavity so that if the piston valve 36 moves outwardly, fuel passage to the auxiliary chamber is throttled, while if it moves inwardly, there is free fuel passage of maximum amount to the chamber 32. As the rotor rotates at a normal speed, the piston valve 36 will move outwardly under the influence of centrifugal force and assume a position partly throttling the passage 33 and regulating the amount of fuel to the auxiliary combustion chamber. Underspeed and overspeed of the rotor 20 respectively will permit inward and outward movement of the piston valve 36 with consequent regulation of the fuel passing to the auxiliary chamber 32.

Since the entire right hand face of the rotor 20, as shown, is exposed to the operating pressure in the main combustion chamber, provision is required to absorb or compensate the axial thrust imposed thereon. To this end the bearing 39 may be a thrust bearing but this need only absorb the amount of thrust represented by the diameter of the rotor 20 as it passes through the combustion chamber wall 17. Radially outward portions of the rotor 20, beyond the bearing 39, are balanced, pressurewise, since pressure within the main chamber 16 may be transmitted between the periphery of the rotor 20 and the combustion chamber 16 to a zone 38 between the combustion chamber end 17 and the forward end of the rotor 20. Where the rotor passes through the combustion chamber closure 17, as at the bearing 39, an appropriate seal may be provided.

Cooling of the rotor 20 is furnished inherently by the high rate flow of the liquid fuels therethrough in their passage from the feed conduits 25 and 26 to the main fuel jets 29 and 30. The numbers of auxiliary combustion chambers 32, and regulators 36, and the number of main nozzles 29 and 30 are design considerations which may be developed by those skilled in the art. The foregoing description in connection with FIGS. 1 and 3 covers the primary teachings of the present invention. Many refinements thereon may be made and in the following figures, some of these refinements are covered.

Referring to FIGS. 4-7, a more highly developed rocket engine is shown, this engine comprising a packaged unit incorporating its own fuel tankage and its own starting and ignition mechanism. A unit of this type is adapted for short operating periods, single usage, and is contemplated for use with missiles. Elements like those already described bear the same reference character with "a" added. Herein, a unit container includes a first fuel tank 40 and a second fuel tank 41 in tandem relation, the tank 40 feeding the rotor passage 24a and the tank 41 feeding the rotor passage 23a, the rotor 20a being provided with the same general types of auxiliary combustion chambers, fuel jets, and rotor speed control previously described. Since this unit is adapted for single shot operation, the tanks 40 and 41 may be filled with fuel long in advance of operation and sealing of these fuels from inadvertent leakage through the rotor is provided during filling, handling and shipping. The rotor shaft 42, carried in suitable bearings in the partition 17a and in the tank structure, engages, through dogs 43, a seal plate 44 which is secured to the front wall 67 of the tank 40. This seal disk 44 is carried on guide pins 45 and is spring pressed at 46 toward leftward open movement. The pins 45 are shouldered and normally the shoulders engage the disk to hold the spring 46 in a compressed condition. As soon as the shaft 42 is enforced to rotation, it moves the disk 44 on the pins 45 to alinement with the disk holes, after which the spring 46 pushes the disk 44 leftwardly, opening the tank 40 to free communication with the passage 24a in the rotor.

In somewhat similar fashion, the interior of the tank 41 is statically sealed from communication with the rotor passage 23a by a seal annulus 47, connected to the combustion chamber closure 17a and to the exterior of the shaft 42, this seal 47 being spring pressed at 47'. When the rotor 20a starts to turn, the seals between the member 47, the partition 17a, and the shaft 42 are broken after which the spring 47' urges the member 47 to the left and opens the tank 41 to free communication with the rotor passage 23a.

On the open face of the rotor 20a, a cavity 48 is provided by a cover plate 49, the cavity 48 being filled with a solid powder propellant. The cover 49 includes an igniting squib 50 which may be served through the main combustion chamber nozzle 18a. The cavity 48 is connected through a filter screen 51 to a conduit 52 opening through suitable check valves and throttling orifices to the tanks 40 and 41. The cavity is further connected through passages 53 (FIG. 7) to the rotor combustion chamber 32a. Upon igniting the powder charge in the cavity, combustion products rush into the chambers 32a and through the rotor drive nozzles 35a, enforcing rotor rotation. Concurrently the fuel tank seals 44 and 47 are opened, admitting fuel from the tanks to the chambers 23a and 24a. Some of the propellant combustion gas enters the passage 52 and the fuel tanks 40 and 41 through throttling orifices to pressurize the liquid fuels, driving them into the rotor. The rotor picks up the liquid fuels and normal operation of the reaction engine is started as soon as the solid propellant burns out and the liquid propellants being to feed. While normal operation of the system continues, gas pressure from the chambers 32a maintains pressure on the liquid fuel within the fuel tanks through the passages 53, the cavity 48, the conduit 52 and the throttling orifices.

The rotor combustion chamber 32a in FIG. 4 is annular or toroidal in form and may be provided with any suitable number of slanted drive nozzles 35a as may be required to pump an adequate amount of liquid fuels to sustain rated thrust of the reaction engine.

It will be seen in FIGS. 4, 5 and 6 that the rotor passage 23a leads into a peripheral zone 55 in the rotor, around the chamber 32a, whence liquid fuel is fed inwardly to a plurality of substantially radial cavities 56 into which the main fuel nozzles 29a open. Also, the pump cavity 24a feeds a plurality of outwardly extending cavities 57 into which the main jets 30a open. Fuels for the combustion chamber 32a are fed from one or more passages 33a communicating, through the cavities 57, with the pump cavity 24a. A centrifugal fuel control valve 36a, similar to that previously described, regulates the flow of liquid through the passage 33a. Fuel from the rotor passage 23a feeds to the combustion chamber 32a through one or more openings 34a in the outer wall of the rotor combustion chamber. As noted in FIG. 6, some of the fuel may be fed to the drive nozzle 35a through openings 58 and 59 connecting with fuel cavities 57 to provide film cooling for the nozzles, thereby holding their temperatures within tolerable limits.

To fully compensate thrust on the rotor face, one or more orifices 60 are provided near the flanged rim at the front face of the rotor at its periphery. Fuel under high pressure enters the space between the partition 17a and the front rotor face, balancing thrust imposed on the rotor face. Excess fluid in this space escapes rearwardly to the combustion chamber around the flanged rotor rim, the rotor having slight axial freedom of movement to enable automatic regulation of the size of this escape passage. Cooling may be provided at the throat of the nozzle 18a through jets 61 fed through an annulus 62 and conduits 63, the latter leading to a cavity 64 between seals 65 and 66 between the partition 17a and the front wall of the rotor. The cavity 64 is furnished with fluid at moderate pressure from orifices 66 which bleed off a minor amount of fuel from the rotor chamber 23a. Since the orifices 66 are disposed inwardly from the edge of the rotor, the centrifugal pressure applied to the conduits 63 is at a lower level than the pressure imposed on the main jets or the film cooling jets 60.

Since the fuel in the two tank compartments 40 and 41, separated by a partition 67, should be prevented from intermixture to avoid possible precombustion, and since the rotor shaft 42 is carried by the partition 67 and the partition 17a, appropriate seals 68 and 69 are provided around the shaft 42 to prevent leakage between the tanks when the rotor is in normal operation. The space between the seals 68 and 69 is vented to the atmosphere through conduits 70 and 71. There is also a flinger seal 72 between the two conduits 70 and 71 so that the expected small leakage through the seals from the respective tanks may not mix within the entire system. For storing the unit with fuel in the tanks, the bearings and seals may be packed with plastic insoluble sealing material which breaks away when rotor rotation is initiated.

Reference may now be made to FIGS. 8–12 which show a modification of the rocket engine of this invention which is adapted for throttling operation and for multiple starts and runs, and such an engine may be applied to non-expendable rocket driven craft such as personnel carrying and recoverable equipment. Units of this embodiment similar to those already described bear the same reference characters with the letter "b" added and their functions and general arrangements will be clear from the descriptions already given. The rotor 20b has fluid passages 23b and 24b therein in much the same fashion as has been described previously. Since this engine is adapted for utilization with separate tankage, the passage 23b connects with a feed volute 75 and a passage 76 extending inwardly from the volute toward the axis of the rotor. The volute is connected by a suitable conduit 77 to fuel tankage. In somewhat similar fashion, the rotor shaft 42b encompasses the rotor passage 24b which connects with a volute 78 through a radially inwardly extending passage 79, the volute 78 being connected to a tank through a conduit 80. In the passages 79 and 76 are disposed axially movable shut-off valve annuli 81 and 82. Preferably, these are coincidentally operated by a rod 83 having a rack 84 in the open space between the two volutes. A pinion 85 operated by links 86 from a valve control bell crank 87, enables the valve annuli 81 and 82 to be moved at will to positions which open or close the passages 79 and 76. In much the same manner as in FIG. 4, the rotor shaft 42b is carried in bearings in the stator part of the system and is provided with seals 68b and 69b to prevent fuel leakage. Also, the valve annulus 81 is provided with a resilient seal 89 and the valve annulus 82 is provided with a resilient seal 90, these sealing against shoulders on the outside of the elements 97 and 42b when the valves are closed.

The combustion chamber 16b is jacketed for coolant flow over the entire surface, one of the fuels being fed from the rotor passage 23b through a passage 91, and a check valve 92 to the inner annular jacket 93 through which it passes to the rear end of the combustion chamber and returns through an outer annular jacket 94. The fluid discharges as an ejector at an annular nozzle 95 into the inlet passage 76 leading to the rotor passage 23b. Thereby, forced circulation of one of the fuels for cooling purposes is attained to hold the combustion chamber 16b within a tolerable temperature range and also this fluid enforces boosting of fuel feed from the passage 76 into the pump passage 23b.

The rotor 20b includes a control conduit 97 to which a controllable fluid pressure may be applied from the fuel inlet 79, through means of a valve rod 98 adjusting an orifice 98b. As shown in FIGS. 9 and 11, the conduit 97 leads through the rotor 20b to apply pressure on the spring end of the centrifugally actuated control valve 36b which controls the flow of one of the fuels to the rotor driving combustion chamber 32b. This valve 36b provides, as previously described, a speed responsive fuel control to the rotor driving combustion chamber whereby increased speed reduces the area of the passage 33b. In this case, fuel pressure in the passage 24b acts on the valve plunger 36b and also passes through a hole therein to the throttling passage 33b, while controlled fluid pressure from the conduit 97 acts against this. The speed of the rotor is controllable during operation by the application of controlled fluid pressure upon the outer end of the valve 36b through the conduit 97. In effect, the force exerted on the valve 36b by the spring 37b may be increased by pressure in the conduit 97 to enable operation of the rotor 20b at a higher speed level than that afforded by the action of the spring 37b alone. Lower rotational speeds of the rotor 20b are obtained by low pressure in the conduit 97. Speed of rotor 20b controls total fuel feed to the engine, and consequently the thrust output thereof.

In FIGS. 8 and 12 an arrangement is shown which provides for electrical ignition of combustible fuels existing in the rotor driving combustion chamber 32b. The ignition assembly is indicated at 100, this being fed by a suitable induction coil 101, through a switch 102 from a power source 103. Referring to FIG. 12 the ignition assembly includes a housing 104 on the outside of the combustion chamber 16b, containing a sylphon bellows 105 fixed at its inner end and having a closure 106 at its outer end engageable with shoulders on the housing 104 to limit its movement. Communication is established between the interior of the bellows 105 and the inside of the combustion chamber 16b by a vent 107. The closure 106 includes an insulating bushing 108 which carries a stem 109 extending through the combustion chamber wall from which the electrode is insulated by a bushing 110. The rim of the rotor 20b carries an insulating bushing 111 and a slidable electrode 112 embraced by a conductive sleeve, the inner end of the electrode being flanged and contactable with a washer 113 connected to the rotor 20b. When the stem 109 touches the electrode 112 and its surrounding sleeve, inductive energy is built up in the coil 101 which dissipates in an igniting spark between 112 and 113 when the electrode 112 breaks from the washer 113. The elements 109 and 112 are so organized that they will contact one another once during each revolution of the rotor 20b and at a time when there is substantially ambient pressure within the combustion chamber 16b. When the engine is started, with the ignition switch 102 turned on, the circuit is made and broken, as the elements 109 and 112 contact each other and as an igniting spark flashes across the gap between 112 and 113 to ignite combustible mixtures pumped into the rotor combustion chamber 32b. Upon such ignition rotor rotation will be speeded up by discharge of gases through the rotor nozzles 35b and fuel pumped into the main combustion chamber 16b will be ignited by the hot discharge from the nozzles 35b. As the pressure builds up within the main combustion chamber 16b, such pressure will be transmitted to the interior of the bellows 105 and will push the closure 106 outwardly, separating the elements 109 and 112 from further contacts and terminating the electrical ignition. When main combustion chamber pressure drops to a low level due to throttling of fuels, the ignition elements are again ready for operation upon restarting.

Various other forms of ignition systems may be utilized with the embodiment of FIG. 8 or, in fact with any of the other engine embodiments of other figures previously described and to be described. However, the ignition arrangement shown is simple in character and requires no complex components.

Reference may now be made to FIG. 13 which shows a modification of the same type of reaction engine of FIG. 8. It will be recalled that in the FIG. 8 arrangement, the fuel component entering the volute 75 is pressurized by bleed of part of the fluid from the rotor 20b while the fuel component entering the system from the volute 78 has no specific means shown for pressurization. In the FIG. 8 arrangement, the tank feeding the volute 78 may be pressurized from an external source.

In the FIG. 13 arrangement, a booster pump is provided in connection with the volute 78 to provide initial fluid pressure to feed the fuel to the rotor system through the rotor shaft 42b. The housing of the volute 78 includes a bell portion 116 within which is contained an impeller 117 piloted on and rotatable with respect to the rotor shaft 42b. The latter shaft in conjunction with the impeller 117 includes a fluid coupling 118 through which the impeller is driven from the shaft 42b. The impeller 117 picks up fuel from the volute 78 delivering it to the bell housing 116 whence it flows past the annular shut-off valve 81 into the hollow passage 24b of the rotor shaft 42b. Since the spacing of the annular valves 81 and 82 in this arrangement is greater than that of FIG. 8, independent operating means for these valves are shown which are finally coordinated for joint operation in a control member 119. The valves, as desired, may be operated coincidentally or in a predetermined sequence to enable one fuel to lead the other fuel so that both arrive at the rotor spray nozzles at appropriate times.

In the arrangement of FIG. 13, in accordance with the above description, both of the fuel components are fed to the reaction engine rotor under pressure. Furthermore, since pressure is built up in the bell housing 116, a greater pressure is available to the control conduit 97 through the orifice 98b and the pressure control valve 98 whereby speed regulation of the rotor through the feed of fuel therethrough may embrace a wider range.

In connection with all of the foregoing arrangements of the invention and as indicated near the beginning of the specification, the main fuel jets 29 and 30 are so arranged that streams of the two fuels from respective jets impinge upon one another to assist in providing an efficient combustible mixture. This relationship of impinging jets must be maintained for effective operation of the engine regardless of the speed of the pumping rotor 20.

In FIG. 14 I show an alternative arrangement of main jets and rotor driving jets. In this figure, elements analogous to those already described are given the same reference characters followed by the letter "c." The rotor 20c within the main combustion chamber 16c is provided with passages 23c and 24c which extend around the rotor to the portion thereof adjacent the main body of the combustion chamber 16c and include dividing portions 122 and 123 respectively fed from the passages 23c and 24c. Within the rotor combustion chamber 32c outwardly facing fuel jets 125 and 126 are provided, respectively communicating with the passages 123 and 122. These jets may be angled toward one another so that the stream therefrom will impinge, but both jets 125 and 126 eject their streams in an outward direction. The openings of both jets lie the same distance from the axis of rotation of the rotor so that the liquid passing through each is subjected to the same level of centrifugal force. Thus, these fuel jets will impinge upon one another and the flow characteristics from both jets will remain substantially consistent at rotational speeds within the operating speed range of the rotor.

In much the same manner, an outer portion of the rotor 20c is provided with fuel jets 127 and 128 respectively connected with the cavities 122 and 123. The jets 127 and 128 lie at the same radial distance from the rotor axis and are aimed toward one another so that the streams therefrom impinge within the main combustion chamber 16c. These streams, regardless of rotor speed, will continue to impinge for efficient mixture and combustion within the main combustion chamber and the flow through the jets will be consistent for best mixture at any speed. The jets 125 and 126 feed fuel to the rotor combustion chamber for rotor driving, while the jets 127 and 128 are main jets for producing the majority of thrust from the reaction engine.

FIG. 15 shows another alternative fuel jet system along with an alternative arrangement for rotor speed control. Herein, elements resembling those already described bear the same reference characters followed by the letter "d." Within the rotor combustion chamber 32d and in the rotor walls, an annular inwardly facing groove 130 is provided which groove is fed with fuel from the rotor passage 24d through a drilling 131 which includes a metering constriction 132. Outboard of the constriction 132 is an opening 133 into a cavity 134 which in turn is connected to the rearward face of the rotor 20d through a passage 135. A passage 136 is provided in the rotor structure to establish communication from the rotor cavity 23d to the rotor combustion chamber 32d, the passage 136d lying a short distance radially outward from the groove 130. During rotation of the rotor 20d, fuel from the passage 24d is centrifugally fed to the groove 130, the fuel spilling over the edge of the groove as indicated and being flung outwardly in a conically shaped sheet. This fuel mixes with the other fuel entering the rotor combustion chamber through the passages 136 whereby the two fuels are intimately mixed and combusted to drive the rotor. A somewhat similar construction is arranged on the rearward face of the rotor 20d wherein an annular groove 137 is provided, fed from the rotor passage 24d whereby the fuel spills over the edge of the groove and is whirled in a rearward and radially outward direction. The end of the rotor passage 23d is provided with jets 138 which eject streams of fuel to intercept the fuel which has been flung from the groove 137. The arrangements 137 and 138 provide fuel for the main combustion chamber while the arrangements 130 and 136 provide fuel for the rotor combustion chamber.

Within the rotor cavity 134 is a conical washer-like annulus 140 like a Belleville washer, the outer rim of which normally covers and seals the bypass passages 133 connecting with the passages 131. Under the influence of centrifugal force, the annulus 140 will be urged away from the passages 133, allowing part of the fuel from the latter to flow into the cavity 134 and thence to the main combustion chamber through the passages 135. By this means, automatic speed regulation for the rotor is accomplished since overspeed of the rotor will open the passage 133, diminishing the amount of fuel which is fed to the annular groove 130 thereby decreasing the impulse derived from the rotor combustion chamber 32d and its nozzles 35d. In this arrangement, the amounts of fuel ultimately reaching the main combustion chamber from the rotor passages 23d and 24d will remain constant to afford an ultimate substantially stoichiometric fuel mixture. Within the rotor combustion chamber 32d, the stoichiometric mixture will not necessarily maintain, since fuel from the jets 136 will be fed at a rate which is a function of r.p.m. while fuel from the annular groove 130 will be affected by the opening of the valve 140. However, since bleed from the passage 131 is ultimately delivered to the main combustion chamber through the passage 135, consistency of fuel proportioning is maintained so that optimum fuel economy will result. In the previously described embodiments, the mixture ratios in the rotor combustion chamber would be upset to some extent so that the ultimate thrust obtainable from a perfect mixture of both fuels would be altered to the extent that one of the two propellant fuels would be fed in a slightly excessive amount to that which is actually required for perfect complete combustion.

The bypass valve 140 may effectively be used as an adjustable speed control for the rotor. To this end, the rim of the washer is connected by a sylphon 142 to the rotor structure and the inner edge of the valve 140 is more or less rigidly connected to the rotor structure at 143. Through the elements 142 and 143, a closed cavity is formed to which a conduit 144 is connected, this conduit extending as at 145 axially of the rotor to a suitable controllable pressure source. By adjusting the pressure exerted against the valve 140, the speed level at which the rotor will operate may be varied, to enable control of the total thrust available from the reaction engine. A suitable constant pressure level may be maintained upon the valve 140 through the conduit 145, yet the valve will still respond to centrifugal force to automatically compensate fuel feed, should speed errors exist, to bring the rotor to the desired speed.

The foregoing descriptions provide a number of exemplary arrangements for a rocket engine or reaction engine which are susceptible to a great many modifications and detailed improvements. The specific configurations of the various components described are not to be considered as limiting the scope of the invention nor are the specific systems shown and described to be considered as restrictive. Many of the features herein described and hereafter claimed may be utilized in combination with already known reaction engine components and various kinds of cooling, ignition, starting and fuel feed arrangements will become readily apparent to those skilled in the art.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In a bi-propellant rocket engine comprising a combustion chamber structure having a discharge orifice, a fuel pumping and feeding rotor within said structure having fuel feed passages thereto from outside said structure, said passages continuing into said rotor, an auxiliary combustion chamber in said rotor, fed from said passages, having an orifice slanted relative to the rotor axis and discharging into said structure, and main fuel jets in the rotor, fed from said passages for feeding fuel directly to said combustion chamber, said structure having fuel tanks secured thereto as a unit structure, and conduits from said tanks to said passages.

2. In a bi-propellant rocket engine comprising a combustion chamber structure having a discharge orifice, a fuel pumping and feeding rotor within said structure having fuel feed passages thereto from outside said structure, said passages continuing into said rotor, an auxiliary combustion chamber in said rotor, fed from said passages, having an orifice slanted relative to the rotor axis and discharging into said structure, main fuel jets in the rotor, fed from said passages for feeding fuel direct to said combustion chamber, said rotor having rotary sealing connections with said structure, and fuel transfer means between said connections to feed fuel to said rotor passages, said connections including seals normally sealing said fuel from said passages when the rotor is static, said seals being disruptable upon rotor starting to allow of fuel flow to said passages.

3. In a bi-propellant rocket engine comprising a combustion chamber structure having a discharge orifice, a fuel pumping and feeding rotor within said structure having fuel feed passages thereto from outside said structure, said passages continuing into said rotor, an auxiliary combustion chamber in said rotor, fed from said passages, having an orifice slanted relative to the rotor axis and discharging into said structure, and main fuel jets in the rotor, fed from said passages for feeding fuel directly to said combustion chamber, said passages in the rotor including a speed responsive valve to vary the feed of fuel from said passage to said auxiliary combustion chamber.

4. In a rocket power plant, a main combustion chamber, a liquid fuel feeding and pumping rotor in the chamber having centrifugal pumping passages therein, fuel spray nozzles therein, fed from said passages and disposed near the rotor periphery for direct discharge into the main chamber, said rotor having a combustion chamber therein, auxiliary nozzles in said rotor fed from said passages and feeding fuel to said rotor combustion chamber, a discharge orifice in the rotor for said rotor combustion chamber having its axis spaced from and skewed relative to the rotor axis, and means to control the speed of said rotor, comprising a throttling valve in said rotor for regulating fuel fed to said combustion chamber, and means responsive to increase in centrifugal force due to rotor overspeeding to close said throttling valve.

5. In a rocket power plant, in a main combustion chamber, a liquid fuel feeding and pumping rotor in the chamber having centrifugal pumping passages therein, fuel spray nozzles therein, fed from said passages and disposed near the rotor periphery for direct discharge into the main chamber, said rotor having a combustion chamber therein, auxiliary nozzles in said rotor fed from said passages and feeding fuel to said rotor combustion chamber, a discharge orifice in the rotor for said rotor combustion chamber having its axis spaced from and skewed relative to the rotor axis, and means to control the speed of said rotor comprising an adjustable throttling valve in said rotor for regulating fuel feed to said combustion chamber.

6. In a rocket power plant, a main combustion chamber, a liquid fuel feeding and pumping rotor in the chamber having centrifugal pumping passages therein, fuel spray nozzles therein, fed from said passages and disposed near the rotor periphery for direct discharge into the main chamber, said rotor having a combustion chamber therein, auxiliary nozzles in said rotor feed from said passages and feeding fuel to said rotor combustion chamber, a discharge orifice in the rotor for said rotor combustion chamber having its axis spaced from and skewed relative to the rotor axis, said rotor having a closed receptacle therein in communication with said passages, a solid propellant in said receptacle, and means to ignite said propellant to start rotation of said rotor by the issue of propellant gases through said combustion chamber and its discharge orifice, said rotor as a result of initial rotation serving to pump said liquid propellant.

7. In a non-rotating rocket motor having a main chamber, a pump rotor for pumping liquid propellant into the motor and disposed within the motor chamber, jet means forming part of said rotor for driving same, a supply of solid propellant in said rotor, means for igniting the solid propellant, means conveying the solid propellant combustion products to said jet means, and means to direct liquid propellant to said jet means after said solid propellant is spent.

8. In a rocket power plant, a liquid propellant centrifugal pumping rotor, propellant supply means therefor, a non-rotating main chamber containing said rotor into which the rotor discharges propellant, said rotor containing a combustion chamber and a slanted drive nozzle fed therefrom and discharging into said main chamber, means to divide and feed propellant to the rotor chamber and to the main chamber, and means to regulate the division of propellant between said chambers.

9. In a rocket power plant, a liquid propellant centrifugal pumping rotor, propellant supply means therefor, a non-rotating main chamber containing said rotor into which the rotor discharges propellant, said rotor containing a combustion chamber and a slanted drive nozzle fed therefrom and discharging into said main chamber, means to divide and feed propellant to the rotor chamber and to the main chamber, a booster pump for propellant upstream of said rotor, and means to drive said booster pump from said rotor.

10. In a rocket power plant, a liquid propellant centrifugal pumping rotor, propellant supply means therefor, a non-rotating main chamber containing said rotor into which the rotor discharges propellant, said rotor containing a combustion chamber and a slanted drive nozzle fed therefrom and discharging into said main chamber, means to divide and feed propellant to the rotor chamber and to the main chamber, a booster pump for propellant upstream of said rotor, and yielding fluid coupling means to drive said booster pump from said rotor.

11. In a rocket power plant, a liquid propellant centrifugal pumping rotor, propellant supply means therefor, a non-rotating main chamber containing said rotor into which the rotor discharges propellant, said rotor containing a combustion chamber and a slanted drive nozzle fed therefrom and discharging into said main chamber, means to divide and feed propellant to the rotor chamber and to the main chamber, a high pressure propellant bleed from said rotor, and means to direct said bleed to the rotor inlet to urge propellant flow to said rotor.

12. In a rocket power plant, a liquid propellant centrifugal pumping rotor, propellant supply means therefor, a non-rotating main chamber containing said rotor into which the rotor discharges propellant, said rotor containing a combustion chamber and a slanted drive nozzle fed therefrom and discharging into said main chamber, means to divide and feed propellant to the rotor chamber and to the main chamber, a high pressure propellant bleed from said rotor, and means to direct said bleed between the rotor and main chamber wall to compensate pressure on the face of said rotor, said rotor having a face subject to main chamber pressure and an opposite portion spaced from a portion of the main chamber wall.

13. In a rocket power plant, a liquid propellant centrifugal pumping rotor, propellant supply means therefor, a non-rotating main chamber containing said rotor into which the rotor discharges propellant, said rotor containing a combustion chamber and a slanted drive nozzle fed therefrom and discharging into said main chamber, means to divide and feed propellant to the rotor chamber and to the main chamber, there being two propellants supplied to and pumped by said rotor, and said dividing and feeding means being organized to vary the proportion of propellants fed to the rotor chamber, but to maintain a uniform overall proportion of propellants fed to said main chamber.

14. In a non-rotating rocket motor having a main combustion chamber, a pump rotor for pumping liquid propellant into the motor and disposed within the motor chamber, jet means forming part of said rotor for driving same and discharging into said motor chamber, said jet means being driven by said propellant, nozzles in said rotor feeding propellant to said jet means, nozzles in said rotor feeding propellant directly to said main combustion chamber, and valve means connected with the rotor nozzles to reduce flow thereto upon increase in rotor speed.

15. In a non-rotating rocket motor having a main combustion chamber, a pump rotor for pumping liquid propellant into the motor and disposed within the motor chamber, jet means forming part of said rotor for driving same and discharging into said motor chamber, said jet means being driven by said propellant, nozzles in said rotor feeding propellant to said jet means, nozzles in said rotor feeding propellant directly to said main combustion chamber, and valve means connected with the rotor nozzles to reduce flow thereto upon increase in rotor speed, said valve means comprising a bypass diverting flow from the nozzles.

16. In a non-rotating rocket motor having a main combustion chamber, a pump rotor for pumping liquid propellant into the motor and disposed within the motor chamber, jet means forming part of said rotor for driving same and discharging into said motor chamber, said jet means being driven by said propellant, nozzles in said rotor feeding propellant to said jet means, nozzles in said rotor feeding propellant directly to said main combustion chamber, and valve means connected with the rotor nozzles to reduce flow thereto upon increase in rotor speed, said valve means comprising a centrifugally actuated device.

17. In a non-rotating rocket motor having a main combustion chamber, a pump rotor for pumping liquid propellant into the motor and disposed within the motor chamber, jet means forming part of said rotor for driving same and discharging into said motor chamber, said jet means being driven by said propellant, nozzles in said rotor feeding propellant to said jet means, nozzles in said rotor feeding propellant directly to said main combustion chamber, valve means connected with the rotor nozzles to reduce flow thereto upon increase in rotor speed, said valve means comprising a centrifugally actuated device, and controllable pressure means for loading said valve against centrifugal force.

18. In a non-rotating rocket motor having a main combustion chamber, a pump rotor for pumping liquid propellant into the motor and disposed within the motor chamber, jet means forming part of said rotor for driving same and discharging into said motor chamber, said jet means being driven by said propellant, nozzles in said rotor feeding propellant to said jet means, nozzles in said rotor feeding propellant directly to said main combustion chamber, and means for throttling the flow of fluid to said rotor upstream thereof.

19. In a non-rotating rocket motor having a main combustion chamber, a pump rotor for pumping liquid propellant into the motor and disposed within the motor chamber, jet means forming part of said rotor for driving same and discharging into said motor chamber, said jet means being driven by said propellant, nozzles in said rotor feeding propellant to said jet means, nozzles in said rotor feeding propellant directly to said main combustion chamber, and intermittently energized ignition means carried by said rotor and acting on said jet means.

References Cited in the file of this patent

UNITED STATES PATENTS

| Number | Name | Date |
|---|---|---|
| 1,003,708 | Coleman | Sept. 19, 1911 |
| 2,395,403 | Goddard | Feb. 26, 1946 |
| 2,444,742 | Lutjen | July 6, 1948 |
| 2,445,856 | Mayer | July 27, 1948 |
| 2,523,656 | Goddard | Sept. 26, 1950 |
| 2,531,761 | Zucrow | Nov. 28, 1950 |
| 2,532,469 | Trautman | Dec. 5, 1950 |
| 2,536,600 | Goddard | Jan. 2, 1951 |
| 2,536,601 | Goddard | Jan. 2, 1951 |
| 2,568,921 | Kroon | Sept. 25, 1951 |
| 2,579,049 | Price | Dec. 18, 1951 |
| 2,592,938 | McNaught | Apr. 15, 1952 |
| 2,594,788 | Morain | Apr. 29, 1952 |
| 2,596,161 | Murdock et al. | May 13, 1952 |